United States Patent
Ohama

Patent Number: 6,139,447
Date of Patent: Oct. 31, 2000

[54] RUBBER COMPOSITION FOR GOLF BALL AND GOLF BALL PRODUCED USING THE SAME

[75] Inventor: Keiji Ohama, Hyogo-ken, Japan

[73] Assignee: Sumitomo Rubber Industries Limited, Hyogo-Ken, Japan

[21] Appl. No.: 09/175,580

[22] Filed: Oct. 20, 1998

[30] Foreign Application Priority Data

Oct. 24, 1997 [JP] Japan ................................. 9-309677

[51] Int. Cl.[7] .................................................. A63B 37/12
[52] U.S. Cl. ............................................. 473/378; 473/377
[58] Field of Search .................................... 473/372, 376, 473/377, 378; 273/DIG. 10

[56] References Cited

U.S. PATENT DOCUMENTS 5,215,308  6/1993  Hiraoka et al. ................. 273/DIG. 10
5,733,974  3/1998  Yamada et al. .................... 473/372 X

FOREIGN PATENT DOCUMENTS 6-007481A  1/1994  Japan .

Primary Examiner—Jeanette Chapman
Assistant Examiner—Raeann Gorden
Attorney, Agent, or Firm—Birch, Stewart, Kolasch & Birch, LLP

[57] ABSTRACT

The present invention provides a rubber composition for a golf ball, including: 100 parts by weight of a base rubber which is a mixture of polybutadiene (A) having Mooney viscosity of 40 to 65 and polybutadiene (B) having Mooney viscosity of 20 to 35, a weight ratio the polybutadiene (A)/the polybutadiene (B) being 40/60 to 90/10; and 5 to 60 parts by weight of vulcanized rubber powder. The polybutadiene (A) and the polybutadiene (B) respectively includes 40 or more percent of cis-1,4 bonds.

14 Claims, 1 Drawing Sheet

RUBBER COMPOSITION FOR GOLF BALL AND GOLF BALL PRODUCED USING THE SAME

BACKGROUND OF THE INVENTION

The present invention relates to a rubber composition capable of producing a golf ball which provides good shot feeling and extended durability, and a golf ball such as a one-piece golf ball, a two-piece golf ball, and a multi-piece golf ball produced using the same.

Commercial golf balls fall into two broad categories: thread-wound golf balls and solid golf balls. The commercial solid golf balls fall into two categories: one-piece solid golf balls and two-piece golf balls. A one-piece solid golf ball has a single-layered structure of a vulcanized rubber composition. A two-piece golf ball has a two-layered structure of a core and a cover. The core has a single-layered structure of a vulcanized rubber composition, and is covered with the cover having a single-layered structure.

The solid golf ball is superior to the thread-wound golf ball in resilience and flight distance. However, the solid golf ball has a problem that it produces hard and bad shot feeling when hit.

In order to solve the problem of bad shot feeling that the two-piece golf ball has, there have been developed a new type of two-piece solid golf ball called "a soft two-piece golf ball", and a multi-piece golf ball having three or more layered structure. The multi-piece golf ball has three or more layered structure of a core and a cover. The core has one or more layered structure of a vulcanized rubber composition, and is covered with the cover having two or more layered structure.

The soft two-piece golf ball and the multi-piece golf ball produce soft shot feeling when hit, because the difference in hardness between the center and the periphery of the core is made to be large. However, the large difference in hardness between the periphery and the center of the core lowers the durability of the golf ball. As a result, the golf ball is likely to break, and there is a case where it breaks after being hit less than thirty times with a golf club which produces large impact such as a driver.

In order to solve the above-described problem and to improve the durability of the golf ball, Japanese Unexamined Patent Application No. 6-7481 suggests to add vulcanized rubber powder to the rubber composition for the core. However, in this prior art, large amount of the vulcanized rubber powder is added to the rubber composition, and therefore, only small amount of unvulcanized lubber component is contained. The large amount of the vulcanized rubber powder increases the hardness of the core, and the resultant golf ball becomes hard and produces bad shot feeling. Furthermore, the rubber composition containing the large amount of the vulcanized rubber powder cannot be smoothly kneaded, and lowers the workability of the golf ball production.

A one-piece golf ball also has a problem as follows. That is, a one-piece solid golf ball is used at a golf practice range in many cases. Accordingly, the main requirement for the one-piece golf ball is high durability such that it never breaks even when repeatedly hit, rather than good shot feeling. Recently, there has been a remarkable progress in golf club technology, and the golf club gives large impact to the golf ball. The conventional solid golf ball is unable to resist such large impact.

SUMMARY OF THE INVENTION

The present invention has solved the problems of the prior art described above, and the objective thereof is to provide a rubber composition capable of producing a golf ball which exhibits good shot feeling and high durability, and a golf ball produced using the same.

According to the present invention, 100 parts by weight of a base rubber which is a mixture of polybutadiene (A) having Mooney viscosity of 40 to 65 and polybutadiene (B) having Mooney viscosity of 20 to 35, a weight ratio the polybutadiene (A)/the polybutadiene (B) being 40/60 to 90/10; and 5 to 60 parts by weight of vulcanized rubber powder.

These and other objects, features and advantage of the present invention will become more apparent upon reading the following detailed description and accompanying drawings.

In the present invention, the Mooney viscosity is measured in accordance with "Mooney viscosity test" defined in "Physical testing methods for unvulcanized rubber" of JIS (Japanese Industrial Standard)-K-6300. The test is conducted at 100° C. To be exact, the Mooney viscosity of 40 to 65 defined in the present invention is 40 to 65 $ML_{1+4}$ (at 100° C.), and the Mooney viscosity of 20 to 35 is 20 to 35 $ML_{1+4}$ (at 100° C). However, in the present invention, the word "$ML_{1+4}$" is omitted in accordance with the practice in this industrial field, and only numeric values are shown.

In the present invention, "JIS-C hardness" means the hardness measured with a JIS-K-6301 C-type hardness tester.

DETAILED DESCRIPTION OF THE DRAWINGS

Figure 1:
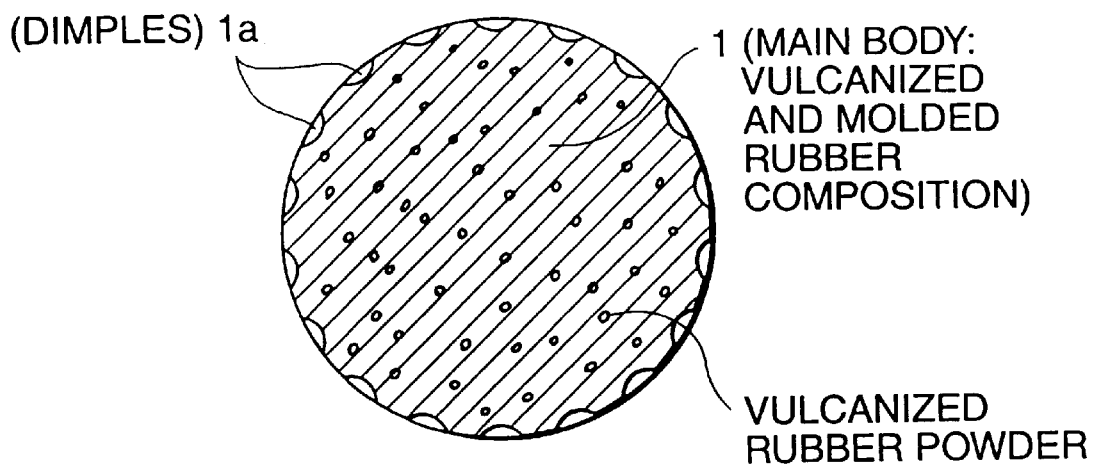
FIG. 1 is a cross-sectional view schematically showing an example of a golf ball according to the present invention.

According to the present invention, a rubber composition used for a solid golf ball includes an unvulcanized rubber component including a base rubber, and vulcanized rubber powder.

First, the base rubber of the present invention will be described.

The base rubber is a mixture of polybutadiene (A) having Mooney viscosity of 40 to 65 and polybutadiene (B) having Mooney viscosity of 20 to 35 at a weight ratio between the polybutadiene (A) and the polybutadiene (B), i.e. A/B of 40/60 to 90/10, and more preferably 50/50 to 85/15. The Mooney viscosity is measured using an L-shaped rotor, and the rotor was operated for 1 minutes of preheat and 4 minutes of rotor operation. If the amount of the polybutadiene (A) is excessive and the amount of the polybutadiene (B) is short, and the weight ratio A/B of 40/60 to 90/10 is not satisfied, it becomes impossible to use satisfactory amount of the vulcanized rubber powder. The resultant golf ball does not exhibit soft shot feeling and enhanced durability. Contrary to this, if the amount of the polybutadiene (A) is short and the amount of the polybutadiene (B) is excessive, and the weight ratio A/B of 40/60 to 90/10 is not satisfied, the base rubber becomes too soft. This results in lowering the workability of the golf ball production. In addition, the resultant golf ball has poor resilience and poor flight performance.

As described above, the polybutadiene (A) has Mooney viscosity of 40 to 65. If the Mooney viscosity is lower than 40, the golf ball exhibits poor resilience. Contrary to this, if the Mooney viscosity is higher than 65, the base rubber becomes too hard, and as a result, the workability of golf ball production is lowered. The polybutadiene (B) has Mooney viscosity of 20 to 35. If the Mooney viscosity is lower than 20, the golf ball exhibits poor resilience. Contrary to this, if the Mooney viscosity is higher than 35, it becomes impossible to use satisfactory amount of vulcanized rubber powder.

The respective polybutadienes (A) and (B) preferably contain 40 or more percent of cis-1,4 bonds. With the content of 40 or more percent of cis-1,4 bonds, the golf ball has excellent resilience.

On top of the base rubber, the unvulcanized rubber component may further include a small amount of other unvulcanized rubber components such as natural rubber, isoprene rubber, styrene-butadiene rubber, chloroprene rubber, acrylonitrile rubber, polybutadiene rubber having Mooney viscosity falling outside the above-described range. When other rubber components are included, it is preferable that the base rubber constitutes 90 or more weight percent of the rubber component for the golf ball excluding the vulcanized rubber powder.

Next, the vulcanized rubber powder of the present invention will be described.

The vulcanized rubber powder of the present invention may be prepared from recycled waste rubber of vulcanized rubber product, in particular, recycled rubber of the main body of one-piece solid golf ball and the core of two or multi-piece golf ball. Alternatively, the vulcanized rubber powder is obtained by newly producing vulcanized rubber and then grinding it into powder. In the latter case, the vulcanized rubber is made of a composition including a rubber component and a vulcanizing agent. Preferably, the rubber component is entirely polybutadiene containing 40 or more percent of cis-1,4 bonds; however, it may further include a little amount of other rubber component such as isoprene rubber, natural rubber, and styrene-butadiene rubber, on top of the polybutadiene containing 40 or more percent of cis-1,4 bonds. Preferable examples of the vulcanizing agent include: a reaction product obtained by reacting $\alpha,\beta$-ethylenically unsaturated carboxylic acid with metal oxide such as zinc oxide in a rubber composition; $\alpha,\beta$-ethylenically unsaturated carboxylic acid and/or the metal salt thereof. These vulcanizing agents are used together with 0.1 to 6 parts by weight of a vulcanization initiator such as organic peroxide, e.g., dicumyl peroxide. On top of the above, polyfunctional monomers, phenylene bismaleimide, sulfur may be also used as the vulcanizing agent. These may be used without the vulcanization initiator. Among them, especially preferable as the vulcanizing agent are a reaction product obtained by reacting $\alpha,\beta$-ethylenically unsaturated carboxylic acid with metal oxide such as zinc oxide in a rubber composition; metal salt of $\alpha,\beta$-ethylenically unsaturated carboxylic acid including zinc methacrylate, zinc acrylate, calcium methacrylate; phenylene bismaleimide and the like. The preferable amount of the vulcanizing agent is 10 to 50 parts by weight with respect to 100 parts by weight of the rubber component.

The composition for the vulcanized rubber powder may further include 1 to 50 parts by weight of inorganic filler such as barium sulfate and calcium carbonate for adjusting the gravity and enhancing the strength, an antioxidant for enhancing the resistance to oxidizing, color powder, and the like.

Thus-prepared composition is vulcanized at 140 to 190° C., and preferably 150 to 180° C., for 10 to 60 minutes to produce vulcanized rubber which is in turn ground into powder. As a result, the vulcanized rubber powder is obtained.

The vulcanized rubber powder preferably has an average particle diameter of 1 mm or smaller. Although the lower limit thereof is not specifically defined, the lower limit of 0.1 μm is practical. If the average particle diameter exceeds 1 mm, the vulcanized rubber powder does not sufficiently disperse in the rubber composition for the golf ball. The method of grinding the vulcanized rubber is not specifically limited, and preferable method is freeze pulverization, because it can produce minute rubber particles which finely disperse in the rubber composition for the golf ball during the kneading step. However, taking into consideration the productivity and cost performance, conventional pulverization methods may be employed as far as they are capable of forming the rubber powder having an average particle diameter of about 0.1 mm.

The vulcanized rubber before cracked and/or ground into powder preferably has a JIS-C hardness of 40 to 95, and more preferably 55 to 80. If the hardness does not fall within this range, the golf ball possibly has poor durability.

Thus-obtained vulcanized rubber powder is mixed with the base rubber to produce the rubber composition of the present invention. The use amount of the vulcanized rubber powder is 5 to 60 parts by weight, and more preferably 10 to 50 parts by weight, with respect to 100 parts by weight of base rubber. If the amount of the vulcanized rubber powder is less than 5 parts by weight with respect to 100 parts by weight of base rubber, the resultant golf ball is poor in durability. If the amount of the vulcanized rubber powder is larger than 60 parts by weight with respect to 100 parts by weight of base rubber, the rubber composition becomes excessively bard and cannot smoothly kneaded. This results in lowering the workability of the golf ball production.

The function of the combination of the base rubber and the vulcanized rubber powder has not been resolved, and therefore, the way that this combination attains soft shot feeling and extended durability is still unknown; however, the function of this combination is conceived as follows. The vulcanized rubber powder is effective in allowing the rubber composition to finely disperse in the main body or the core of the golf ball, and in suppressing runaway reaction of a vulcanizing agent such as the metal salt of $\alpha,\beta$-ethylenically unsaturated carboxylic acid during the vulcanization, thereby giving high durability to the golf ball. The polybutadiene (A) is effective in giving a required resilience to the golf ball. The polybutadiene (B) is effective in maintaining the resilience derived from the polybutadiene (A), and also in attaining soft shot feeling. Specifically, in the present invention, although the core contains large amount of vulcanized rubber powder, the polybutadiene (B) having low Mooney viscosity serves to attain soft shot feeling. Due to the combination of the base rubber and the vulcanized rubber powder, the rubber composition of the present invention is capable of producing a golf ball which has the extended durability and good shot feeling.

The rubber composition for the golf ball further includes the vulcanizing agent. Preferable examples of the vulcanizing agent include: a reaction product of $\alpha,\beta$-ethylenically unsaturated carboxylic acid such as acrylic acid and methacrylic acid with metal oxide such as zinc oxide in the rubber composition as is used in the prior art; $\alpha,\beta$-ethylenically unsaturated carboxylic acid such as acrylic acid and methacrylic acid; metal salt of $\alpha,\beta$-ethylenically unsaturated carboxylic acid such as zinc acrylate and zinc methacrylate, and the like. These vulcanizing agents are used together with a vulcanization initiator such as organic peroxide, e.g., dicumyl peroxide, 1,1-bis(t-butyl peroxy)3,3,5-trimethylcyclohexane, and the like. On top of the above, polyfunctional monomer, phenylene bismaleimide, and sulfur may be used as the vulcanizing agent. These vulcanizing agents may be used without the vulcanization initiator. Furthermore, the rubber composition may further includes an inorganic filler such as barium sulfate and calcium carbonate for adjusting the gravity and enhancing the strength, a softner and liquid rubber for adjusting the hardness, an antioxidant for enhancing resistance to oxidizing, and the like. It is preferable that the use kind and amount of them are adjusted in accordance with the properties of the vulcanized rubber composition.

The base rubber is mixed with the vulcanized rubber powder and the above-described additives such as the vulcanizing agent using a conventional device such as a roller, a kneader, and a Banbury mixer, to produce the rubber composition. The rubber composition is vulcanized and molded into a main body of one-piece solid golf ball, or a core of two-piece golf ball or multi-piece golf ball. The vulcanization is conducted under the same conditions as those conventionally employed, for example, at 140 to 190° C., and preferably 150 to 180° C. for 10 to 60 minutes.

The vulcanized and molded rubber composition preferably has a JIS-C hardness of 50 to 90. Even if the rubber composition contains no vulcanized rubber powder, the vulcanized and molded rubber composition has a JIS-C hardness of 50 to 90. That is, regardless of the presence or absence of the vulcanized rubber powder, the rubber composition for the golf ball has a JIS-C hardness of 50 to 90 when it is vulcanized and molded.

Next, an exemplary golf ball according to the present invention will be described referring to the drawings. FIG. 1 is a cross-sectional view showing a golf ball having one-layered structure generally called a one-piece solid golf ball. In FIG. 1, reference numeral 1 denotes a main body of the golf ball, and 1a denotes dimples. The main body 1 is produced by vulcanizing and molding the rubber composition which includes, as described above, 100 parts by weight of the base rubber and 5 to 60 parts by weight of the vulcanized rubber powder. The base rubber is a mixture of the polybutadiene (A) having Mooney viscosity of 40 to 65 and the polybutadiene (B) having Mooney viscosity of 20 to 35 at a weight ratio the polybutadiene (A)/the polybutadiene (B) of 40/60 to 90/10.

Figure 2:
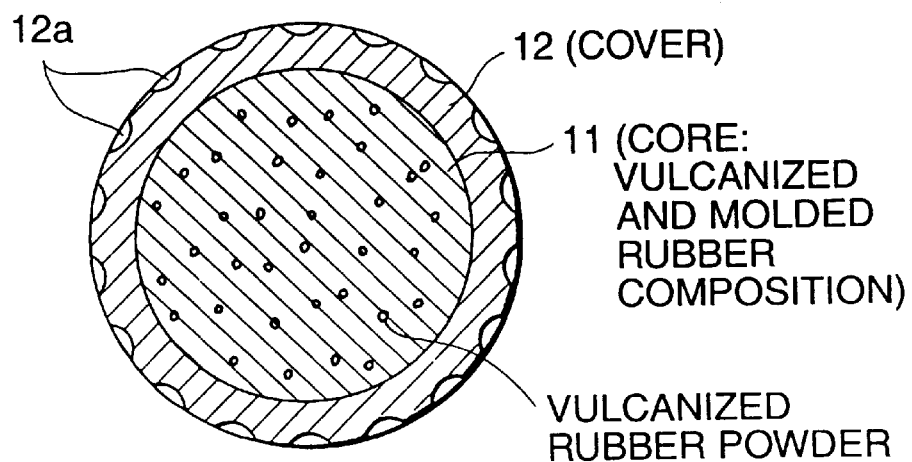
FIG. 2 is a cross-sectional view schematically showing another example of a golf ball according to the present invention.

FIG. 2 is a cross-sectional view showing a golf ball having a two-layered structure generally called a two-piece solid golf ball. In FIG. 2, reference numeral 11 denotes a core, 12 a cover which covers the core 11, and 12a dimples. The core 11 is produced by vulcanizing and molding the rubber composition. The rubber composition includes, as described above, 100 parts by weight of the base rubber and 5 to 60 parts by weight of the vulcanized rubber powder. The base rubber is a mixture of the polybutadiene (A) having Mooney viscosity of 40 to 65 and the polybutadiene (B) having Mooney viscosity of 20 to 35 at a weight ratio the polybutadiene (A)/the polybutadiene (B) of 40/60 to 90/10. The cover 12 is not specifically limited, and any conventional ones may be used. In general, however, the cover is made of ionomer resin or a mixture of ionomer resin and other thermoplastic resins as a base resin, to which a pigment such as titanium oxide is added. Although the golf ball shown in FIG. 2 is a two-layered solid golf ball in which both core and cover have a one-layered structure, the present invention is also applicable to a three or more layered golf ball in which both or either one of the core or the cover has a two or more layered structure.

If the multi-piece golf ball has a core including two or more layers, at least one of the layers is made of the above-described rubber composition, and preferably, all the layers are made of the above-described rubber composition.

Dimples 1a and 12a are formed on the surface of the main body 1a and the surface of the cover 12, and the number and shape thereof are determined so as to give the required characteristics to the golf ball. If necessary, the golf ball is painted or marked with any mark on or over its surface.

The main body of a one-piece golf ball, the core of two-piece golf ball, and the core of multi-piece golf ball, which are produced using the rubber composition of the present invention, also preferably have the JIS-C hardness of 50 to 90. With the hardness of higher than 90, the golf ball is excessively hard and may exhibit a bad shot feeling. Contrary to this, with the hardness of lower than 50, the golf ball is excessively soft and may be poor in durability.

EXAMPLES

Hereinafter, the present invention is described concretely by way of the following examples. It should be noted, however, that the present invention should not be limited to the examples.

Examples 1 to 4 and Comparative Examples 1 and 2

In Example 1, materials shown in Table 1 were mixed with each other to prepare a rubber composition. The rubber composition was vulcanized at 165° C. for 20 minutes, thereby forming a one-piece golf ball having an outer diameter of 42.7mm shown in FIG. 1. In Table 1, the unit of the amount of each material is parts by weight. Hereinafter, the unit of the amount of each material in Tables 1 to 5 are parts by weight. In addition, Table 1 also shows the JIS-C hardness of the rubber composition, excluding the vulcanized rubber powder, which was vulcanized under the above-described vulcanizing conditions.

Repeating the same steps, each one-piece golf ball of Examples 2 to 4 and Comparative Examples 1 and 2 was produced.

In Examples 1 to 4, a base rubber was a mixture of BR-11 (polybutadiene, a product of Japan Synthetic Rubber Co., Ltd.) having Mooney viscosity of 43.5 and 95.6 percent of cis-1,4 bonds, and BR-10 (polybutadiene, a product of Japan Synthetic Rubber Co., Ltd.) having Mooney viscosity of 27.5 and 94.6 percent of cis-1,4 bonds. The BR-11 having Mooney viscosity of 43.5 is used as the polybutadiene (A), and the BR-10 having Mooney viscosity of 27.5 is used as the polybutadiene (B). The vulcanized rubber powder will be described later. In Examples 1 to 4 and Comparative Examples 1 to 2, used as an antioxidant was Noklack NS-7 (2,5-di-t-butylhydroquinone, a product of Ohuchi Shinko Kagaku Co., Ltd.) and used as a vulcanization initiator was Parkmill D (dicumyl peroxide, product of NOF Corporation).

TABLE 1

| One-piece golf ball | | Example 1 | Example 2 | Example 3 | Example 4 | Comparative Example 1 | Comparative Example 2 |
|---|---|---|---|---|---|---|---|
| Base rubber | BR-11 | 67 | 67 | 83 | 83 | 100 | 100 |
|  | BR-10 | 33 | 33 | 17 | 17 | — | — |
| Zinc oxide | | 23 | 23 | 23 | 23 | 23 | 23 |
| Zinc acrylate | | 20 | 20 | 20 | 20 | 20 | 20 |
| Antioxidant | | 0.5 | 0.5 | 0.5 | 0.5 | 0.5 | 0.5 |
| Vulcanization initiator | | 1.5 | 1.5 | 1.5 | 1.5 | 1.5 | 1.5 |
| Vulcanized rubber powder | | 20 | 40 | 20 | 40 | 0 | 20 |
| Hardness of vulcanized base rubber | | 70 | 70 | 70 | 70 | 70 | 70 |

The vulcanized rubber powder used in Examples 1 to 4 and Comparative Example 2 was prepared by the following manner. Materials shown in Table 2 were mixed with each other to prepare at rubber composition. The rubber composition was vulcanized at 165° C. for 20 minutes to form a rubber sheet having a thickness of 3mm. The rubber sheet was roughly cracked with a crusher into particles of about 1 to 3mm in diameter, and then was further ground with a centrifugal mill into powder having an average particle diameter of about 0.1 mm. As a result, the vulcanized rubber powder was obtained. In the production of the vulcanized rubber powder, the same type of BR-11, BR-10, antioxiadant, and vulcanization initiator were used as those shown in Table 1. The rubber sheet had a hardness of 70 measured with JIS-C type hardness tester.

TABLE 2

| Vulcanized rubber powder | Mixed amount |
|---|---|
| BR-11 | 67 |
| BR-10 | 33 |
| Zinc oxide | 23 |
| Methacrylic acid | 20 |
| Antioxidant | 0.5 |
| Vulcanization initiator | 1.5 |
| Hardness | 70 |

As to each one-piece solid golf ball obtained in Examples 1 to 4 and Comparative Examples 1 and 2 respectively, the weight, compression, coefficient of restitution, hardness, and durability were measured, and the shot feeling was evaluated.

In addition to the golf balls of Examples 1 to 4 and Comparative Example 1 and 2, another comparative one-piece solid golf ball was produced repeating the steps of Example 1. In the production of this golf ball, the same type and amounts of materials as those used in Example 1 were used, except that large amount, specifically, 65 parts by weight of vulcanized rubber powder was used. There was a difficulty in mixing the large amount of vulcanized rubber powder with the base rubber, and the workability of the production was very poor; nevertheless, the resultant rubber composition was vulcanized and molded into a one-piece golf ball. Due to the use of large amount of vulcanized rubber powder, the one-piece golf ball was very brittle and was unable to have the above-described measurement and evaluation.

The measurements and evaluation of the golf balls were performed in the following manner.
Compression Using a measuring tool manufactured by ATTI engineering Corporation, the force required to deform a golf ball to a predetermined amount was measured by PGA method. The larger the obtained value is, the harder the golf ball is.
Coefficient of Restitution A golf ball was placed in front of an air-gun, and a column-shaped metal body was discharged from the air-gun to the golf ball at the initial velocity of 45 m/sec. The air-gun was the same type as that used by Royal & Ancient Golf Club (R&A) for measuring the initial velocity of a golf ball. The velocity of the metal body before and after hitting the golf ball was measured with a photoelectric tube, and the coefficient of restitution was calculated from the velocity and the weight of the metal body and the velocity and the weight of the golf ball. The coefficient of restitution was expressed in terms of the index, provided that the golf ball of Comparative Example 1 had a value of 1.000. The larger the coefficient of restitution is, the larger the resilience of the golf ball becomes and the more excellent flight performance the golf ball has.
Hardness The hardness at the center of the core and that at the periphery were measured with JIS-K-6301 C-type hardness tester. In order to measure the hardness at the center of the core, the golf ball was cut into two equal pieces.
Durability A golf ball was thrown against a metal plate at the initial velocity of 45 m/sec. The throwing operation was repeated until the golf ball broke, and the number of times that the golf ball was thrown until it broke was counted. The number of times was expressed in terms of the index, provided that the golf ball of Comparative Example 1 had a value of 100. The larger the index is, the more excellent durability the golf ball has.
Shot Feeling Ten golfers including professional golfers hit golf balls with a 1st wood club to evaluate their shot feelings. The evaluation was conducted in the following four ranks, and each rank means that eight or more golfers out of the ten golfers experienced that shot feeling as to the golf ball.
Ranks for Shot Feeling ⊚: excellent and soft shot feeling, and excellent resilience ○: good soft shot feeling, although less soft than the rank ⊚, and good resilience Δ: relatively hard and large impact X: very hard and bad shot feeling The results are shown in Table 3.

In Table 3, the mark Δ~X means that the shot feeling was evaluated as the rank between Δ and X.

TABLE 3

| One-piece golf ball | Example 1 | Example 2 | Example 3 | Example 4 | Comparative Example 1 | Comparative Example 2 |
|---|---|---|---|---|---|---|
| Weight (g) | 45.6 | 45.7 | 45.8 | 45.6 | 45.5 | 45.7 |
| Compression | 90 | 91 | 91 | 92 | 92 | 93 |
| Coefficient of restitution | 1.000 | 1.001 | 1.002 | 1.003 | 1.000 | 1.001 |
| Hardness (JIS-C) (center-periphery) | 63–76 | 60–76.5 | 60–76.5 | 60–76.5 | 67–75.5 | 63–76 |
| Durability | 145 | 154 | 141 | 153 | 100 | 134 |
| Shot feeling | ◉ | ○ | ◉ | ○ | Δ | Δ~X |

It is noted from Table 3 that, as compared with the golf ball of Comparative Example 1, the golf balls of Examples 1 to 4 had improved durability, and softer and better shot feeling.

Specifically, in Comparative Example 1 used as a standard for comparison, the rubber composition contained only BR-11 (polybutadiene having high Mooney viscosity). Neither BR-10 (polybutadiene having low Money viscosity) nor the vulcanized rubber powder was used. Contrary to this, in Examples 1 to 4, the rubber composition contained a mixture of BR-11 and BR-10 as a base rubber, and the vulcanized rubber powder. As compared with the golf ball of Comparative Example 1, the golf balls of Examples 1 to 4 had improved durability, and softer and better shot feeling. In Comparative Example 2, the rubber composition contained BR-11 as a base rubber, and the vulcanized rubber powder. No BR-10 was used. Due to the absence of BR-10, the golf ball of Comparative Example 2 exhibited bad shot feeling, although it had good durability because of containing the vulcanized rubber powder.

The golf balls of Examples 1 to 4. as compared with those of Comparative Examples 1 and 2, had equal to or higher coefficient of restitution, which is the basis for evaluating the flight performance. This result shows that BR-10 does not adversely affect the flight performance.

Examples 5 to 8 and Comparative Examples 3 and 4

In Example 5, the same type of materials as those used in Examples 1 to 4 and Comparative Examples 1 and 2 were mixed with each other at the ratio shown in Table 4 to produce a rubber composition. The vulcanized rubber powder was of the same type as that used in Examples 1 to 4. The rubber composition was vulcanized and molded at 160° C. for 25 minutes to produce a core having an outer diameter of 38.5 mm. The core was covered with a cover made of a composition including 100 parts by weight of tonomer resin and 2 parts by w eight of titanium oxide, thereby forming a two-piece solid golf ball such as shown in FIG. 2. The golf ball had an outer diameter of 42.7 mm.

Repeating the steps of Example 5, golf balls of Examples 6 to 8 and Comparative Examples 3 and 4 were produced.

The ionomer resin used for the cover was a mixture of Himilan 1605 (a product of Meitsui DuPont Polychemical Co.) and Hiyithan 1706 (a product of Mitsui DuPont Polychemical Co.) at a weight ratio of 50:50.

The weight, compression, coefficient of restitution, hardness, and durability of the two-piece solid golf balls were measured by repeating the measuring method of Example 1, except for the following. That is, the coefficient of restitution was expressed in terms of the index provided that the golf ball of Comparative Example 3 had the value of 1.000; and the durability was expressed in terms of the index provided that the golf ball of Comparative Example 3 had the value of 100. In addition, repeating the evaluation method of Example 1, the shot feeling of the two-piece solid golf balls was evaluated. The results are shown in Table 4. In Table 4, the hardness at the center of the core and at the periphery of the core are shown.

TABLE 4

| Two-piece golf ball | | Example 5 | Example 6 | Example 7 | Example 8 | Comparative Example 3 | Comparative Example 4 |
|---|---|---|---|---|---|---|---|
| Base rubber | BR-11 | 67 | 67 | 83 | 83 | 100 | 100 |
| | BR-10 | 33 | 33 | 17 | 17 | — | — |
| Zinc oxide | | 20 | 23 | 23 | 23 | 20 | 23 |
| Zinc acrylate | | 26 | 26 | 26 | 26 | 26 | 26 |
| Antioxidant | | 0.5 | 0.5 | 0.5 | 0.5 | 0.5 | 0.5 |
| Vulcanization initiator | | 1.5 | 1.5 | 1.5 | 1.5 | 1.5 | 1.5 |
| Vulcanized rubber powder | | 25 | 40 | 25 | 40 | 0 | 25 |
| Hardness of vulcanized base rubber | | 79 | 79 | 79 | 79 | 79 | 79 |

TABLE 5

| Two-piece golf ball | Example 5 | Example 6 | Example 7 | Example 8 | Comparative Example 3 | Comparative Example 4 |
|---|---|---|---|---|---|---|
| Weight (g) | 451.1 | 45.0 | 45.0 | 45.1 | 45.1 | 45.0 |
| Compression | 85 | 86 | 86 | 87 | 87 | 89 |
| Coefficient of restitution | 1.000 | 1.002 | 1.002 | 1.003 | 1.000 | 1.001 |
| Hardness (JIS-C) (center-periphery) | 59–82 | 61–82 | 62.5–83 | 62–63 | 67–80 | 61–81 |

TABLE 5-continued

| Two-piece golf ball | Example 5 | Example 6 | Example 7 | Example 8 | Comparative Example 3 | Comparative Example 4 |
|---|---|---|---|---|---|---|
| Durability | 118 | 129 | 121 | 130 | 100 | 115 |
| Shot feeling | ⊚ | ○ | ⊚ | ○ | Δ | Δ~X |

It is noted from Table 4 that, as compared with the golf ball of Comparative Example 3, the golf balls of Examples 5 to 8 had improved durability, and soft and better shot feeling.

Specifically, in Comparative Example 3 used as a standard for comparison, the rubber composition contained only BR-11 (polybutadiene having high Mooney viscosity). Neither BR-10 (polybutadiene having low Money viscosity) nor the vulcanized rubber powder was used. Contrary to this, in Examples 5 to 8, the rubber composition contained a mixture of BR-11 and BR-10 as a base rubber, and the vulcanized rubber powder. As compared with the golf ball of Comparative Example 3, the golf balls of Examples 5 to 8 had improved durability, and softer and better shot feeling. In Comparative Example 4, the rubber composition contained BR-11 as a base rubber, and the vulcanized rubber powder. No BR-10 was used. Due to the absence of BR-10, the golf ball of Comparative Example 4 exhibited bad shot feeling, although it had good durability because of containing the vulcanized rubber powder.

The golf balls of Examples 5 to 8, as compared with those of Comparative Examples 3 and 4, had equal to or higher coefficient of restitution, which is the basis for evaluating the flight performance. This result shows that BR-10 does not adversely affect the flight performance.

As described above, the rubber composition of the present invention is capable of producing a golf ball with excellent durability and soft shot feeling.

Although the present invention has been fully described by way of examples with reference to the accompanying drawings, it is to be understood that various changes and modifications will be apparent to those skilled in the art. Therefore, unless otherwise such changes and modifications depart from the scope of the present invention, they should be constructed as being therein.

What is claimed is:

1. A rubber composition for a golf ball, comprising:
   100 parts by weight of a base rubber which is a mixture of polybutadiene (A) having a Mooney viscosity of 40 to 45 and polybutadiene (B) having a Mooney viscosity of 20 to 35, wherein a weight ratio of the polybutadiene (A)/the polybutadiene (B) is 40/60 to 90/10; and
   5 to 60 parts by weight of vulcanized rubber powder, wherein said rubber composition is a component selected from the group consisting of a core of a golf ball and a one-piece golf ball body.

2. The rubber composition for a golf ball according to claim 1, wherein the vulcanized rubber powder has a JIS-C hardness of 40 to 95.

3. The rubber composition for a golf ball according to claim 2, wherein the vulcanized rubber powder includes a vulcanized polybutadiene including 40 or more percent of cis-1,4 bonds.

4. The rubber composition for a golf ball according to claim 2, wherein the particle diameter of the vulcanized rubber powder is 1 mm or smaller.

5. The rubber composition for a golf ball according to claim 1, wherein the vulcanized rubber powder has a JIS-C hardness of 55 to 80.

6. The rubber composition for a golf ball according to claim 5, wherein the vulcanized rubber powder includes a vulcanized polybutadiene including 40 or more percent of cis-1,4 bonds.

7. The rubber composition for a golf ball according to claim 5, wherein the particle diameter of the vulcanized rubber powder is 1 mm or smaller.

8. The rubber composition for a golf ball according to claim 1, comprising 90 or more weight percent of the base rubber in a rubber component of the rubber composition, the rubber component excluding the vulcanized rubber powder.

9. A golf ball comprising:
   a main body, said main body comprising:
      the rubber composition of claim 1, wherein said rubber composition has been vulcanized.

10. The golf ball according to claim 9, wherein the vulcanized rubber composition has a JIS-C hardness of 50 to 90.

11. A golf ball comprising:
   a core comprising the rubber composition of claim 1, wherein said rubber composition has been vulcanized, and
   a cover covering the core, wherein the cover has one or more layers.

12. The golf ball according to claim 11, wherein the vulcanized rubber composition has a JIS-C hardness of 50 to 90.

13. A golf ball comprising:
   a core having two or more layers, and
   a cover covering the core, wherein the cover has two or more layers,
   wherein at least one layer of the core comprises the rubber composition of claim 1, said rubber composition having been vulcanized.

14. The golf ball according to claim 13, wherein the vulcanized rubber composition has a JIS-C hardness of 50 to 90.

* * * * *